3,268,430
PROCESS FOR PREPARING ANHYDROUS CHLOROOXIRANE AND CHLOROACETALDEHYDE
Stanley J. Brois, East Brunswick, and Eugene L. Stogryn, Fords, N.J., assignors to Esso Research and Engineering Company, a corporation of Delaware
No Drawing. Filed June 17, 1963, Ser. No. 288,506
1 Claim. (Cl. 204—158)

The present invention concerns itself with a process for the preparation of anhydrous chlorooxirane and anhydrous chloroacetaldehyde by a low temperature photochlorination of ethylene oxide with chlorine. One aspect of the invention relates to the preparation of chlorooxirane and the subsequent low temperature separation technique. Another aspect of the invention concerns the preparation of anhydrous chloroacetaldehyde by the thermal rearrangement of the chlorooxirane product.

Presently, only one method has been reported [C. Walling and P. S. Fredricks, J. Am. Chem. Soc., 84, 3326 (1962)] in the literature for the preparation of chlorooxirane. This procedure involves the photochlorination of ethylene oxide by t-butyl hypochlorite to form chlorooxirane, t-butyl alcohol and other products namely, acetone and methyl chloride which result from the competitive photodecomposition of t-butyl hypochlorite. The isolation of the chlorooxirane product by distillation is seriously complicated by the presence of t-butyl alcohol.

The described procedure which uses t-butyl hypochlorite is primarily of academic interest and obviously suffers particular disadvantages. Prior to the invention disclosed herein, a simple and convenient method for the preparation of chlorooxirane, readily adaptable to commercial operation has not been available.

Chlorooxirane is of considerable utility. For example, it is useful as a monomer for forming new types of polymers and as a reaction intermediate in many reactions. Moreover, its thermal rearrangement to chloroacetaldehyde provides an exceptionally facile route to an important monomer and reaction intermediate which is used for example, in the manufacture of 2-aminothiazole. Chloroacetaldehyde is also used for facilitating bark removal from tree trunks. Still other uses are known and a more practical method for the preparation of chlorooxirane is desirable to further amplify its utility.

Accordingly, an object of this invention is to provide a new and novel process for the production of chlorooxirane. A further object is to provide a process whereby more economical yields of high-purity chlorooxirane are obtained. A particular object is to provide a novel process for the manufacture of anhydrous chloroacetaldehyde. These and other objects will be apparent as the discussion proceeds.

In accordance with one embodiment of the present invention, chlorooxirane is prepared by reacting ethylene oxide with chlorine in a molar ratio of 2:1 to 10:1, preferably about 2 to 3:1 in a reaction zone maintained at temperatures above −60° C. but below −15° C., preferably about −25 to −15° C. The two reactants are admixed in an inert atmosphere, such as nitrogen, in such a manner that the chlorooxirane is formed at a sufficiently rapid rate. In most cases, the liquid or gaseous chlorine is added at a moderate rate over a period of about 1 to 5 hours. The addition of chlorine may be continuous or intermittent.

The photochemical reaction is effectively initiated and sustained by an ordinary sunlamp, such as a 200 watt sunlamp maintained at about 3 to 12 inches from the reaction zone. The rate of the reaction may be controlled by the closeness of the source of light, which may be actinic, ultraviolet, or visible light spectra.

The over-all reaction may be represented by the following equation:

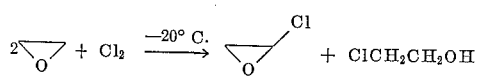

The initial reaction may be considered to involve the formation of chlorooxirane and hydrogen chloride. The latter reacts readily with ethylene oxide to form the 2-chloroethanol. The chlorooxirane and 2-chloroethanol are formed in about equimolar quantities when the reaction temperature is properly controlled.

The reaction mixture is protected by the presence of a dry inert gas, e.g., $N_2$, atmosphere.

By agitation of the reaction mixture the reaction is quickened and temperature control is improved.

Upon completion of the reaction, as evidenced by the disappearance of the color due to chlorine, the mixture is separated into its components. The technique employed involves vacuum distillation at a suitable pressure between −20° to 0° C., preferably 0° C., to obtain a distillate containing unreacted ethylene oxide and chlorooxirane.

The ethylene oxide in the distillate is effectively removed by a low temperature evaporation process. The latter technique involves bubbling an inert gas such as helium or nitrogen through the distillate which is maintained at −30° to 0° C., preferably at −20° to −10° C., until the ethylene oxide is completely removed. The distillate from the evaporation process which contains ethylene oxide with 5 to 10% chlorooxirane can be employed in subsequent chlorination runs.

In the distillation separation of chlorooxirane and ethylene oxide from the reaction product, an inert diluent which can be removed, e.g., higher boiling, may be used. The diluent may serve as a chaser.

The insolubility of chlorooxirane in water permits an extraction technique to be used for separating the chlorooxirane from the ethylene oxide which is readily soluble in water.

Another technique which may be employed for removing excess ethylene oxide involves bubbling hydrogen chloride into the mixture containing the ethylene oxide and chlorooxirane to convert the ethylene oxide to 2-chloroethanol.

The 2-chloroethanol recovered is readily cyclized with alkali to yield ethylene oxide, which may then be dried and recycled for reaction with chlorine.

The presently described synthetic procedure yields chlorooxirane of greater than 95% purity in approximately 50 mole percent yield based on chlorine reacted.

A further object of the present invention is to provide a new and simple process for preparing anhydrous chloroacetaldehyde by the thermal rearrangement of the chlorooxirane product described above. This facile process may be described in terms of the following equation:

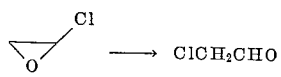

The rearrangement of chlorooxirane may be effected at 25° C. or at its distillation temperature or by heating a solution of chlorooxirane in an inert solvent which includes heptane, benzene, or carbon tetrachloride. The rearrangement affords quantitative yields of anhydrous chloroacetaldehyde which is distillable and may be stored for long periods at low temperatures, e.g., −70° to −30° C.

If one desires, even the mixed by-products, such as the 2-chloroethanol and the chloroacetaldehyde can be reacted and the reaction may be catalyzed by acid to form condensation products, such as acetals and hemiacetals having reactive functions, e.g., chloro, hydroxy, and chloroethoxy.

On the other hand, if one desires to minimize the reaction of the ethylene oxide with HCl so as not to form by-products, a scavenger, such as a basic agent which consumes HCl generated in the chlorination, may be added.

To recapitulate:

The present invention provides an economic and easily controlled method for chlorination of ethylene oxide to the product chlorooxirane at proper low reaction temperatures and the resulting anhydrous chlorooxirane product can be recovered by a low temperature distillation technique.

With the low temperature reaction conditions and separation conditions, no difficulty arises from decomposition to by-products and the amount of chlorine used can be easily controlled, thus eliminating difficulties as to the amount of chlorine employed for the conversion of the ethylene oxide. The high-purity chlorooxirane can be separated economically and efficiently by the low distillation method and when separated can be stored without substantial change at low temperatures, although procedures of other types may be used for the separation.

The chlorooxirane product separated from unreacted oxirane and from the ethylene chlorohydrin is easily converted by thermal rearrangement to the isomeric derivative chloroacetaldehyde.

The by-product formed in the chlorination is easily recovered, converted back to ethylene oxide for recycling or may be used for other purposes. The chlorooxirane product is easily converted to other useful products.

The following but nonlimiting examples illustrate the objects of the present invention.

*Example 1*

A solution of 0.1 mole (7.1 grams) of chlorine in oxirane (1 mole) was irradiated with a 200 watt sunlamp at −20° C. until the yellow color due to chorine disappeared (ca. ½ hour). Gas chromatographic analysis of the reaction mixture showed the presence of chlorooxirane and 2-chloroethanol in the ratio of 3.4:3.3 (area method), respectively.

*Example 2*

A half-mole (35 grams) of chlorine was added in seven grams portions to a mole of oxirane at −20° C. over a 2 hour irradiation period. Each aliquot was added on the disappearance of the yellow color from the previous addition. Vacuum distillation of the reaction mixture at 0° C. gave a distillate containing essentially oxirane and chlorooxirane in a ratio of about 50:50 (by gas chromatography). The unreacted oxirane was effectively removed by a low temperature evaporation technique at −30° C. to 0° C., preferably −20° C. to −10° C. The latter process involved bubbling nitrogen as inert gas through the distillate in a flask attached to a 2 foot "Helipak" column for several hours (6 to 8 hours). Gas chromatographic analysis showed that the contents in the distillation flask after a second vacuum distillation was ca. 98% chlorooxirane; yields, 40 to 50%. The distillate from the low temperature evaporation process which contained 5 to 10% chlorooxirane was employed in subsequent chlorination runs.

The chlorooxirane was characterized by infrared and NMR spectroscopy.

*Analysis.*—Calculated for $C_2H_3ClO$: C, 30.60; H, 3.85; Cl, 45.17. Found: C, 30.65; H, 3.99; Cl, 45.00.

*Example 3*

The distillation of 10 grams of chlorooxirane at atmospheric pressure yields a material boiling at 85° to 87° C. Infrared and NMR spectroscopy indicates that the product is anhydrous chloroacetaldehyde.

*Analysis.*—Calculated for $C_2H_3ClO$: C, 30.60; H, 3.85; Cl, 45.17. Found: C, 31.01; H, 3.65; Cl, 45.24.

*Example 4*

A solution of 5 grams of chlorooxirane in 10 grams $CCl_4$ was heated for several hours. Gas chromatographic analysis indicated that the chlorooxirane was quantitatively converted to anhydrous chloroacetaldehyde.

It will be understood that modifications may be made which come within the spirit of the invention set forth herein and in the claim.

The invention described is claimed as follows:

The process for preparing anhydrous chloroxirane and recovering said chlorooxirane as a high-purity product, which comprises reacting ethylene oxide in liquid phase with chlorine photocatalytically at a temperature in the range of −15° to −60° C. in the presence of an inert gaseous atmosphere of nitrogen to form an anhydrous mixture of unreacted ethylene oxide, 2-chloroethanol and chloroxirane having the formula $C_2H_3ClO$, said mixture being free of other organic compounds, separating the chlorooxirane with the unreacted ethylene oxide as a distillate product by vacuum distillation at about −20° C. to 0° C. from the 2-chloroethanol in said mixture, and evaporating the ethylene oxide with the aid of nitrogen as inert gas from the chlorooxirane in said distillate product at a temperature in the range of −30° C. to 0° C. to recover the chloroxirane as a high-purity product.

References Cited by the Examiner

UNITED STATES PATENTS

| | | | |
|---|---|---|---|
| 2,427,624 | 9/1947 | Rushmer et al. | 260—348.5 |
| 2,549,892 | 4/1951 | Chaney | 260—348.5 |
| 2,628,255 | 2/1953 | Sexton et al. | 260—348 |
| 2,824,112 | 2/1958 | McMann | 260—348 |

FOREIGN PATENTS 1,084,707  7/1960  Germany.

OTHER REFERENCES

Groggins, P. H., Unit Processes in Organic Synthesis (1947), pages 177–180.

Fieser, Organic Chemistry, 3rd Edition (1956), page 41.

Walling et al., J. Am. Chem. Soc., 84, 3326–3331 (1962).

WALTER A. MODANCE, *Primary Examiner.*

NICHOLAS RIZZO, *Examiner.*

NORMA S. MILESTONE, *Assistant Examiner.*